US011151627B2

(12) United States Patent
Stein et al.

(10) Patent No.: US 11,151,627 B2
(45) Date of Patent: Oct. 19, 2021

(54) SYSTEM AND METHOD FOR CUSTOMIZING PHOTO PRODUCT DESIGNS WITH MINIMAL AND INTUITIVE USER INPUTS

(71) Applicant: Shutterfly, LLC, Redwood City, CA (US)

(72) Inventors: Yaron Stein, Haifa (IL); Alexander M. Kenis, Kiryat Motzkin (IL); Roman Sandler, Haifa (IL); Yehonatan Yehudai, Haifa (IL)

(73) Assignee: Shutterfly, LLC, Redwood City, CA (US)

( * ) Notice: Subject to any disclaimer, the term of this patent is extended or adjusted under 35 U.S.C. 154(b) by 0 days.

(21) Appl. No.: 17/070,483

(22) Filed: Oct. 14, 2020

(65) Prior Publication Data

US 2021/0027354 A1 Jan. 28, 2021

Related U.S. Application Data

(63) Continuation of application No. 15/618,801, filed on Jun. 9, 2017, now Pat. No. 10,902,493.

(51) Int. Cl.
*G06Q 30/06* (2012.01)
*G06F 3/0484* (2013.01)
(Continued)

(52) U.S. Cl.
CPC ..... *G06Q 30/0621* (2013.01); *G06F 3/04845* (2013.01); *G06Q 30/0643* (2013.01);
(Continued)

(58) Field of Classification Search
CPC ............ G06Q 30/0621; G06Q 30/0643; G06F 3/04845; G06F 3/0482
(Continued)

(56) References Cited

U.S. PATENT DOCUMENTS

| 2002/0135621 A1* | 9/2002 | Angiulo | G06F 16/958 |
| | | | 715/838 |
| 2003/0035138 A1* | 2/2003 | Schilling | G06Q 30/06 |
| | | | 358/1.15 |

(Continued)

OTHER PUBLICATIONS

Roth et al., Interactive Graphic Design Using Automatic Presentation Knowledge (Year: 1994).*
All New Custom Path Photo Book Creation (Year: 2012).*

*Primary Examiner* — Florian M Zeender
*Assistant Examiner* — Nicole Elena Bruner
(74) *Attorney, Agent, or Firm* — Merchant & Gould P.C.

(57) ABSTRACT

A photo product design customization system for customizing a photo product design with minimal and intuitive user inputs includes a product design module that displays a photo product design in a main design panel, a user input detection unit that can detect a first directional movement from a first dynamic object in a product type selection panel to the main design panel, or a second directional movement from a second dynamic object in a product style selection panel to the main design panel, or a third directional movement from a third dynamic object in a product style selection panel to the main design panel, and an intelligent product design creation engine that can automatically change the photo product design in the main design panel in response to detection of the first, the second, or the third directional movement.

10 Claims, 12 Drawing Sheets

(51) Int. Cl.
 *G06F 3/0482* (2013.01)
 *G06F 15/00* (2006.01)
 *G06F 15/02* (2006.01)

(52) U.S. Cl.
 CPC ............ *G06F 3/0482* (2013.01); *G06F 15/00* (2013.01); *G06F 15/0225* (2013.01)

(58) Field of Classification Search
 USPC ........................................................ 705/26.5
 See application file for complete search history.

(56) References Cited

U.S. PATENT DOCUMENTS

| | | |
|---|---|---|
| 2009/0122329 A1 | 5/2009 | Hegemier |
| 2009/0147297 A1* | 6/2009 | Stevenson ............... G06T 19/00 358/1.15 |
| 2014/0067588 A1 | 3/2014 | Schulman |
| 2016/0098783 A1 | 4/2016 | Margalit |

* cited by examiner

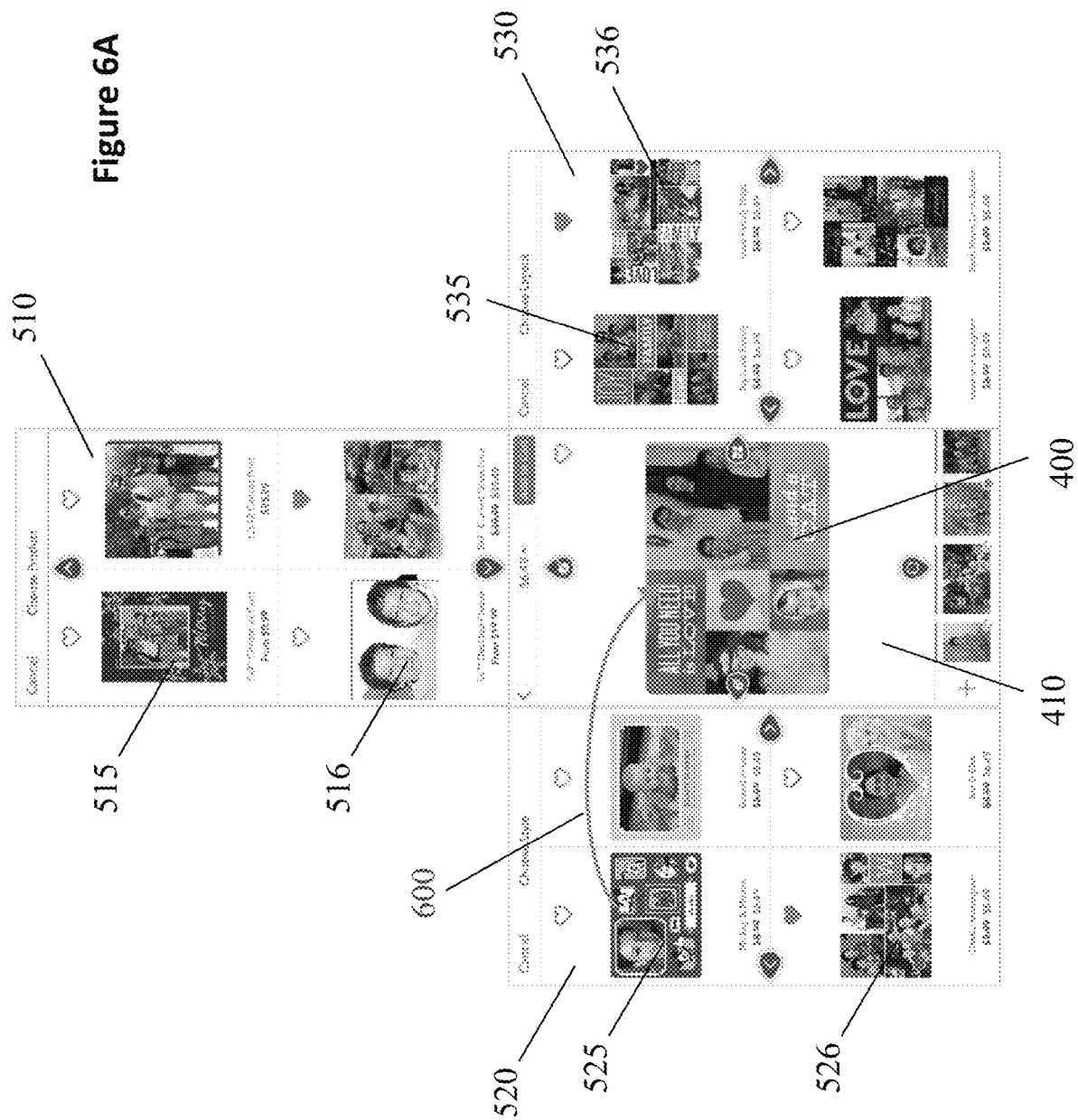

SYSTEM AND METHOD FOR CUSTOMIZING PHOTO PRODUCT DESIGNS WITH MINIMAL AND INTUITIVE USER INPUTS

TECHNICAL FIELD

This application relates to digital imaging technologies and photo products, and in particular, to technologies that can enable personalization of photo product designs with minimal user input.

BACKGROUND OF THE INVENTION

With the advancement of consumer electronic devices, a vast number of pictures are taken by mobile devices and digital cameras. Digital images can be incorporated into product designs for products such as photo books, photo calendars, photo greeting cards, posters, photo décor, photo mugs, photo T-shirts, photo magnets, photo coasters, photo aprons, and so on.

A photo product can include one or more pages. Designing a photo product can include many iterative steps such as selecting an overall style, selecting suitable images, selecting a layout for each page, assigning images to each page, inputting text, rearranging the pages, the images and the text. The product creation process can be quite time consuming. Increasingly, photo products are designed using mobile devices.

There continues to be a need for a method to enable users to design photo products in a convenient and time efficient manner.

SUMMARY OF THE INVENTION

The present application discloses system and method that can significantly enhance users' experiences associated with designing personalized photo products. Automated tools have been developed which allow users to customize and change features of photo products using simple and intuitive user inputs at the computer user interfaces.

An advantageous feature of the presently disclosed invention is that a large number of product features can be changed by a minimal number of user actions. While users are given control, the amount of time and effort spent by users are minimized.

In another perspective, a semi-manual and semi-automatic method is provided to leverage both sophisticated automated product design capabilities and the knowledge of user's preferences to make each design iteration efficient. Product features such as product style, page layout, and product type can be changed by high-level user commands without requiring the users to specify all the design details. An intelligent product design engine is employed to automatically find, produce, rank, select, and incorporate content and design elements to complete each version of a photo product design.

Yet another advantage of the presently disclosed invention is that a photo product design can be customized while staying in a same page view of a computer user interface. This makes design creation and optimization more intuitive and less time consuming, reduces the chance to get lost when users have to click through multiple page views to accomplish such actions.

In one general aspect, the present invention relates to a computer-implemented method for customizing a photo product design with minimal and intuitive user inputs. The method includes: displaying a photo product design in a first product type in a main design panel on a computer device; displaying a product type selection panel adjacent to the main design panel on the computer device, wherein the product type selection panel includes one or more first dynamic objects each representing a particular product type; detecting a first directional movement from a first dynamic object in the product type selection panel to the main design panel by a user input detection unit in a photo product customization system; and in response to detection of the first directional movement, automatically changing the photo product design in the main design panel, by an intelligent product design creation engine in the photo product customization system, to a second product design having a second product type corresponding to the first dynamic object in the product type selection panel, wherein a physical photo product is made at least in part based on the second product design.

Implementations of the system may include one or more of the following. The computer-implemented method can further include automatically selecting or creating, by the intelligent product design creation engine, one or more features in the second product design that are not specified by the second product type. The one or more features include product style, product layout, or selection of photos. The one or more first dynamic objects can be represented by product pictures of different product types. The computer-implemented method can further include: displaying a product style selection panel adjacent to the main design panel on the computer device, wherein the product style selection panel includes one or more second dynamic objects each representing a particular product style; detecting a second directional movement from a second dynamic object in the product style selection panel to the main design panel by the user input detection unit; and in response to detection of the second directional movement, automatically changing the photo product design or the second product design in the main design panel, by the intelligent product design creation engine, to a third product design having a second product style corresponding to the second dynamic object in the product style selection panel, wherein a physical photo product is made at least in part based on the third product design. The computer-implemented method can further include: displaying a product layout selection panel adjacent to the main design panel on the computer device, wherein the product layout selection panel includes one or more third dynamic objects each representing a particular product layout; detecting a third directional movement from a third dynamic object in the product layout selection panel to the main design panel by the user input detection unit; and in response to detection of the third directional movement, automatically changing the photo product design or the second product design in the main design panel, by the intelligent product design creation engine, to a fourth product design having a second product layout corresponding to the third dynamic object in the product layout selection panel, wherein a physical photo product is made at least in part based on the fourth product design.

In another general aspect, the present invention relates to a computer-implemented method for customizing a photo product design with minimal and intuitive user inputs. The method includes: displaying a photo product design in a first product style in a main design panel on a computer device; displaying a product style selection panel adjacent to the main design panel on the computer device, wherein the product style selection panel includes one or more first dynamic objects each representing a particular product style;

detecting a first directional movement from a first dynamic object in the product style selection panel to the main design panel by a user input detection unit in a photo product customization system; and in response to detection of the first directional movement, automatically changing the photo product design in the main design panel, by an intelligent product design creation engine in the photo product customization system, to a second product design having a second product style corresponding to the first dynamic object in the product style selection panel, wherein a physical photo product is made at least in part based on the second product design.

Implementations of the system may include one or more of the following. The computer-implemented method can further include automatically selecting or creating, by the intelligent product design creation engine, one or more features in the second product design that are not specified by the second product style. The one or more features can include product type, product layout, or selection of photos. The one or more first dynamic objects can be represented by product pictures of different product styles. The computer-implemented method can further include: displaying a product type selection panel adjacent to the main design panel on the computer device, wherein the product type selection panel includes one or more second dynamic objects each representing a particular product type; detecting a second directional movement from a second dynamic object in the product type selection panel to the main design panel by the user input detection unit; and in response to detection of the second directional movement, automatically changing the photo product design or the second product design in the main design panel, by the intelligent product design creation engine, to a third product design having a second product type corresponding to the second dynamic object in the product type selection panel, wherein a physical photo product is made at least in part based on the third product design. The computer-implemented method can further include: displaying a product layout selection panel adjacent to the main design panel on the computer device, wherein the product layout selection panel includes one or more third dynamic objects each representing a particular product layout; detecting a third directional movement from a third dynamic object in the product layout selection panel to the main design panel by the user input detection unit; and in response to detection of the third directional movement, automatically changing the photo product design or the second product design in the main design panel, by the intelligent product design creation engine, to a fourth product design having a second product layout corresponding to the third dynamic object in the product layout selection panel, wherein a physical photo product is made at least in part based on the fourth product design.

In another general aspect, the present invention relates to a computer-implemented method for customizing a photo product design with minimal and intuitive user inputs. The computer-implemented method includes: displaying a photo product design in a first product layout in a main design panel on a computer device; displaying a product layout selection panel adjacent to the main design panel on the computer device, wherein the product layout selection panel includes one or more first dynamic objects each representing a particular product layout; detecting a first directional movement from a first dynamic object in the product layout selection panel to the main design panel by a user input detection unit in a photo product customization system; and in response to detection of the first directional movement, automatically changing the photo product design in the main design panel, by an intelligent product design creation engine in the photo product customization system, to a second product design having a second product layout corresponding to the first dynamic object in the product layout selection panel, wherein a physical photo product is made at least in part based on the second product design.

Implementations of the system may include one or more of the following. The computer-implemented method can further include automatically selecting or creating, by the intelligent product design creation engine, one or more features in the second product design that are not specified by the second product layout. The one or more features can include product type, product style, or selection of photos. The one or more first dynamic objects can be represented by product pictures of different product layouts. The computer-implemented method can further include: displaying a product type selection panel adjacent to the main design panel on the computer device, wherein the product type selection panel includes one or more second dynamic objects each representing a particular product type; detecting a second directional movement from a second dynamic object in the product type selection panel to the main design panel by the user input detection unit; and in response to detection of the second directional movement, automatically changing the photo product design or the second product design in the main design panel, by the intelligent product design creation engine, to a third product design having a second product type corresponding to the second dynamic object in the product type selection panel, wherein a physical photo product is made at least in part based on the third product design. The computer-implemented method can further include: displaying a product style selection panel adjacent to the main design panel on the computer device, wherein the product style selection panel includes one or more third dynamic objects each representing a particular product style; detecting a third directional movement from a third dynamic object in the product style selection panel to the main design panel by the user input detection unit; and in response to detection of the third directional movement, automatically changing the photo product design or the second product design in the main design panel, by the intelligent product design creation engine, to a fourth product design having a second product style corresponding to the third dynamic object in the product style selection panel, wherein a physical photo product is made at least in part based on the fourth product design.

In another general aspect, the present invention relates to a photo product design customization system for customizing a photo product design with minimal and intuitive user inputs. The photo product design customization system can include: a product design module that can enable display of a photo product design in a first product type, a first product style, and a first product layout in a main design panel, wherein the product design module can display a product type selection panel, a product style selection panel, or a product layout selection panel adjacent to the main design panel on a computer device, wherein the product type selection panel includes one or more first dynamic objects each representing a particular product type, wherein the product style selection panel includes one or more second dynamic objects each representing a particular product style, wherein the product layout selection panel includes one or more third dynamic objects each representing a particular product layout; a user input detection unit that can detect a first directional movement from a first dynamic object in the product type selection panel to the main design panel, or a second directional movement from a second dynamic object in the product style selection panel to the main design panel, or a third directional movement from a third dynamic object in the product style selection panel to the main design panel; and an intelligent product design creation engine that can automatically change the photo product design in the main design panel to a second product design having a second product type corresponding to the first dynamic object in the product type selection panel in response to detection of the first directional movement, or to a third product design having a second product style corresponding to the second dynamic object in the product style selection panel in response to detection of the second directional movement, or to a fourth product design having a second product layout corresponding to the third dynamic object in the product layout selection panel in response to detection of the first directional movement in response to detection of the third directional movement.

These and other aspects, their implementations and other features are described in detail in the drawings, the description and the claims.

BRIEF DESCRIPTION OF THE DRAWINGS

FIG. 6A illustrates a directional movement from a dynamic object in a product style selection panel to the main design panel in accordance with some embodiments of the present invention.

DETAILED DESCRIPTION OF THE INVENTION

Figure 1:
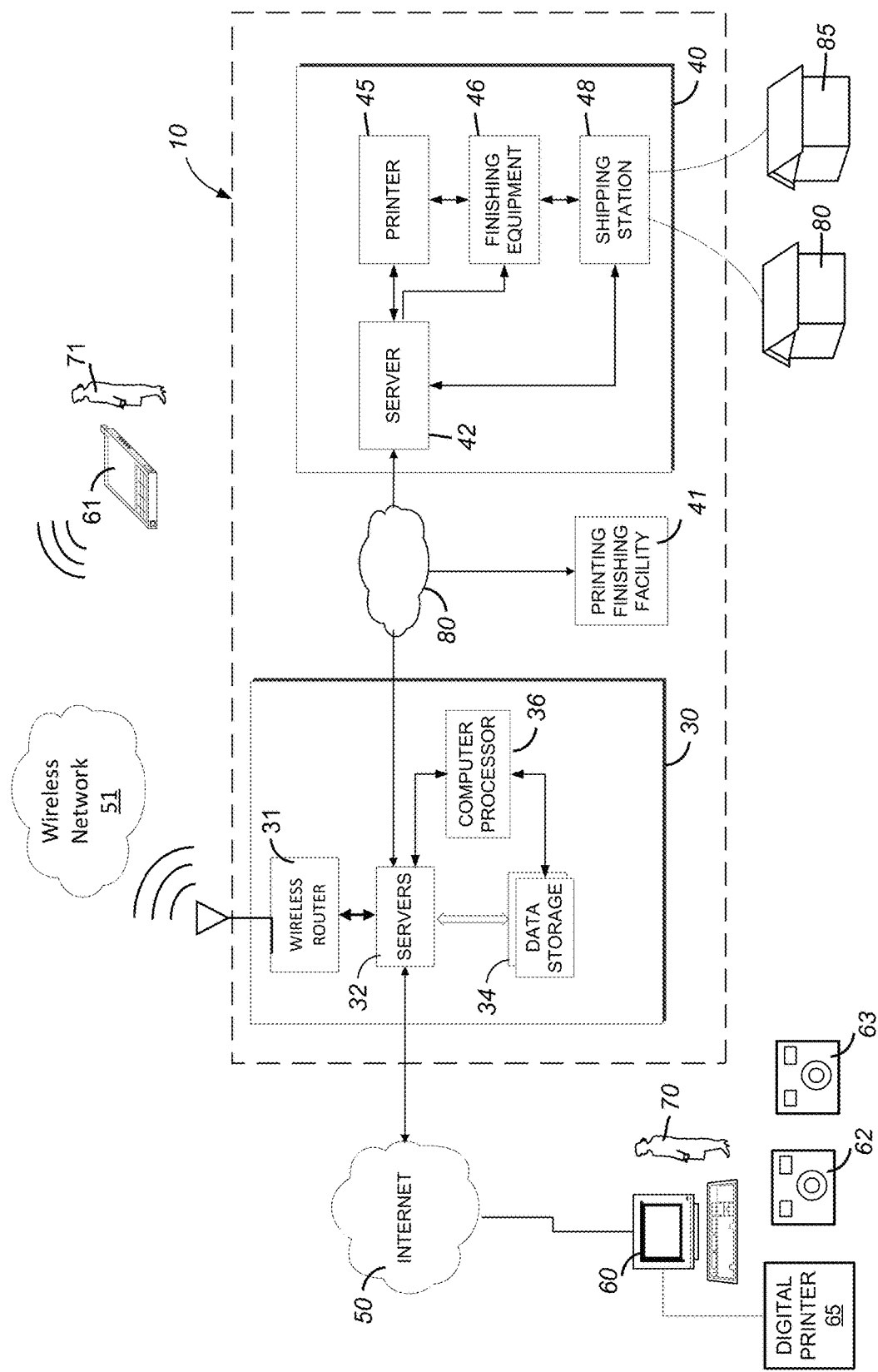
FIG. 1 is a block diagram of a network-based system for creating personalized photo product designs and making associated photo products in accordance with the present invention.

Referring to FIG. 1, a network-based imaging service system 10 includes a data center 30, one or more product fulfillment centers 40, 41, and a computer network 80 that facilitates communications between the data center 30 and the product fulfillment centers 40, 41. The network-based imaging service system 10, operated by an image service provider such as Shutterfly, Inc., allows users 70, 71 to organize and share images via a wired network or a wireless network 51, create photo product designs, and order personalized photo products. The product fulfillment centers 40, 41 can fulfill photo products ordered by users 70, 71.

The data center 30 includes one or more servers 32 configured to communicate with user devices (60, 61) operated by users 70, 71 through the Web or a mobile application, a data storage 34 for storing user data, image and design data, and product information, and computer processor(s) 36 for rendering images and product designs, analyzing and organizing images, and analyzing and understanding user behaviors and preferences. The user data includes account information, discount information, order information, relationship, and important dates associated with each user.

The users 70, 71 can view, edit, organize, and share images, and create designs and order personalized photo products using a mobile application or a browser by accessing the website. Images can also be uploaded from the mobile device 61 or the computer device 60 to the server 32 to allow the user 70 and stored at the data center 30. The images or videos stored in the data storage 34, the computer device 60, or the mobile device 61 usually include groups of photos or videos taken at different events and occasions. If users 70, 71 are members of a family or a group (e.g. a soccer team), the images from the cameras 62, 63 and the mobile device 61 can be grouped together to be incorporated into a photo product such as a photobook, or used in a blog page for an event such as a soccer game.

The users 70, 71 can order a physical product based on the design of the photo product, which can be manufactured by the printing and finishing facilities 40 and 41. A recipient receives the physical product with messages from the users at locations 80, 85. The recipient can also receive a digital version of the design of the photo product over the Internet 50 and/or a wireless network 51.

In the present disclosure, the term "personalized" (or "individualized" or "customized") refers to content such as photos, text, design elements, layouts, or styles that is specific to a user, a recipient, a gift product, or an occasion. A photo product can include a single page or multiple pages. Each page can include one or more images, text, and design elements positioned in proportions in a particular layout. Examples of personalized photo products include photobooks, personalized greeting cards, photo stationeries, photographic prints, photo posters and photo banners, photo banners, photos on canvas, art prints, framed prints, duvet, photo bags, photo playing cards, photo T-shirts, photo mugs, photo aprons, photo magnets, photo mouse pads, photo phone cases, tablet computer cases, photo key-chains, photo collectors, photo coasters, or other types of photo gifts or novelty items. Photobooks can be in the forms of image albums, scrapbooks, bound photo calendars, or photo snap books, etc.

Figure 2:
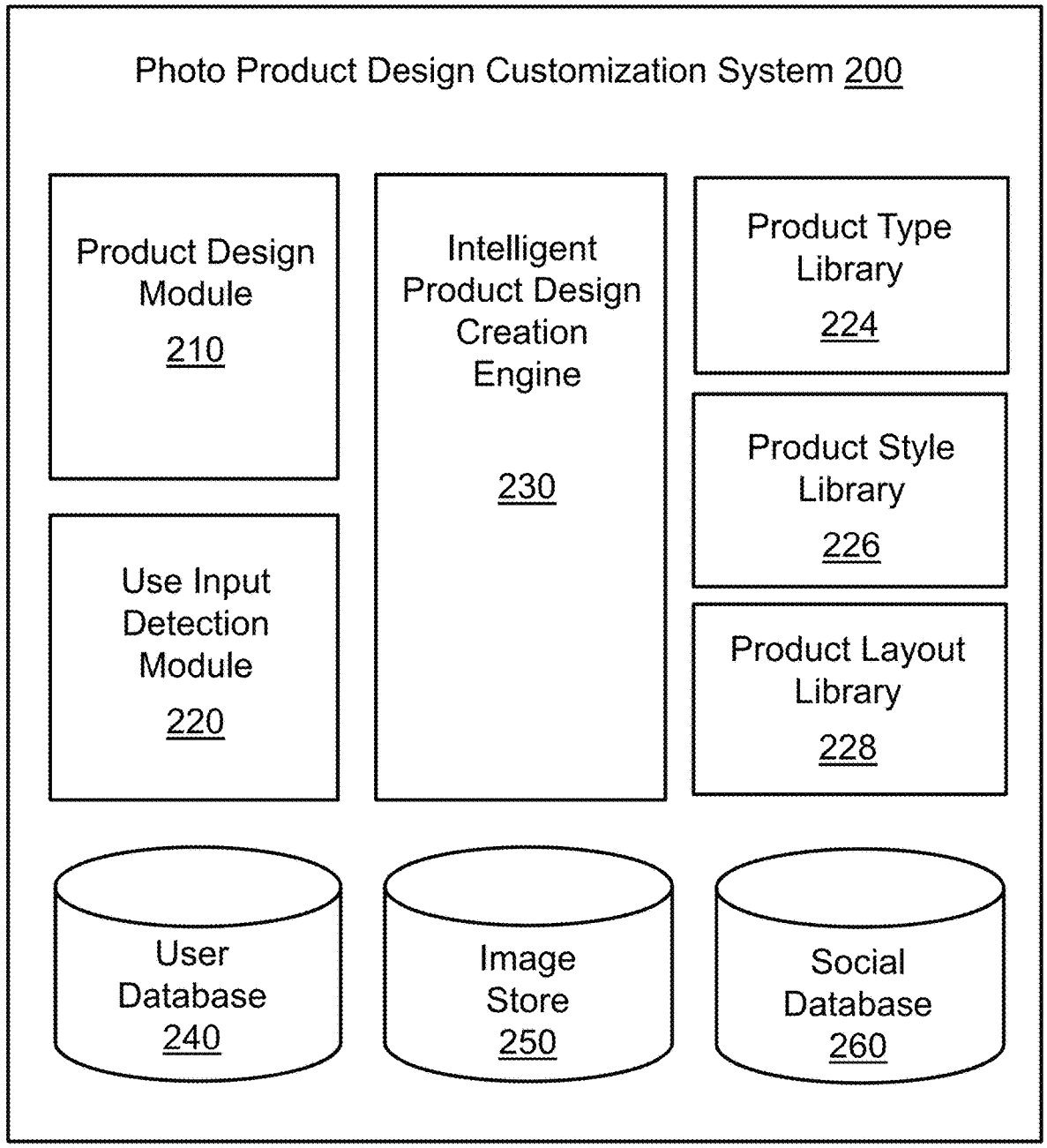
FIG. 2 is a block diagram of a computer system for customizing photo product designs with minimal and intuitive user inputs in accordance with some embodiments of the present invention.

In some embodiments, referring to FIGS. 1 and 2, a photo product design customization system 200 is provided to save users' time and effort in creating photo product designs to better preserve memories and tell stories. The photo product design customization system 200 includes a product design module 210, a user input detection module 220, and an intelligent product design creation engine 230, which provides semiautomatic and semi-manual tools for photo product designs based on imaging intelligence and user input.

The photo product design customization system 200 also includes a product type library 224, a product style library 226, and a product layout library 228, which respectively stores the product types, the product styles, and product layouts for personalized photo products. Product types are normally the types of products that can be manufactured at the printing and finishing facilities 40 and 41 operated by the online image service provider or third-party providers. Product styles and product layouts can include pre-stored lists of styles and layouts, and can also include those dynamically generated by the photo product design customization system 200.

In the present disclosure, the phrase "product style" refers to the background design, embellishments, the color scheme, or other design themes, characteristics, topics, captions, or elements of a photo product. The phrase "product layout" (or page layout) specifies the number, the sizes, the positions of images on a page, the gaps between the images and at the border of the page. The "product layout" can also include positions and sizes of text and other design elements.

The photo product design customization system 200 can also include a user database 240, an image store 250, and a social database 260. The database 240 stores user data such as account information, discount information, and order information associated with users. The image store 250 stores users' photos or stock photos managed by the online image service provider. The social database 260 stores relationships (family members and friends) of a user, and face images and face models for the family members and the friends of the user.

The photo product design customization system 200 can be formed by processors and memory on a user device (60, 61), or servers 32 and data storage 34 in the data center 30, or a combination of the computing components on user device(s) and at the data center.

Figure 3:
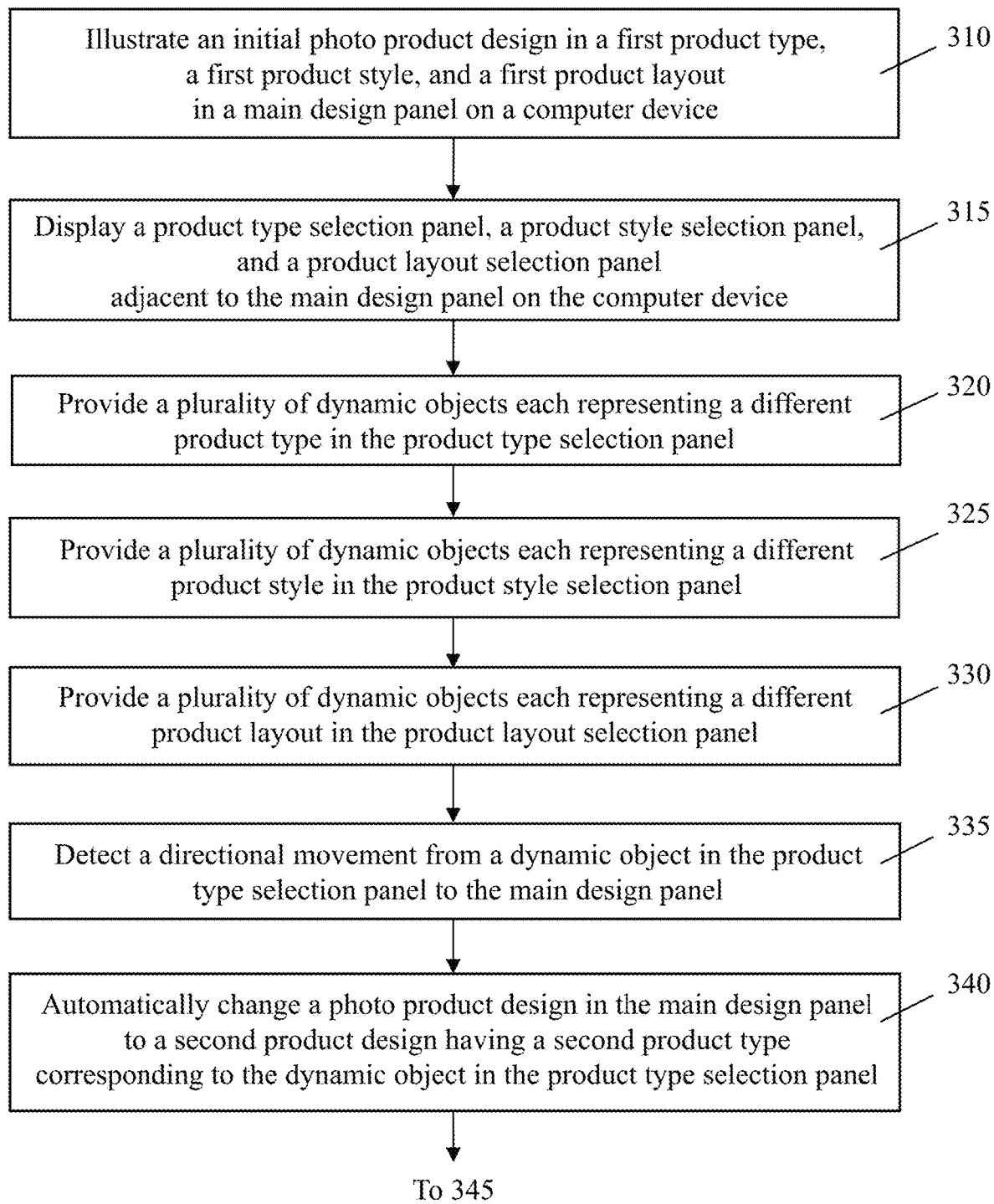
FIG. 3 is a flow diagram for customizing photo product designs with minimal and intuitive user inputs in accordance with some embodiments of the present invention.
Figure 3:
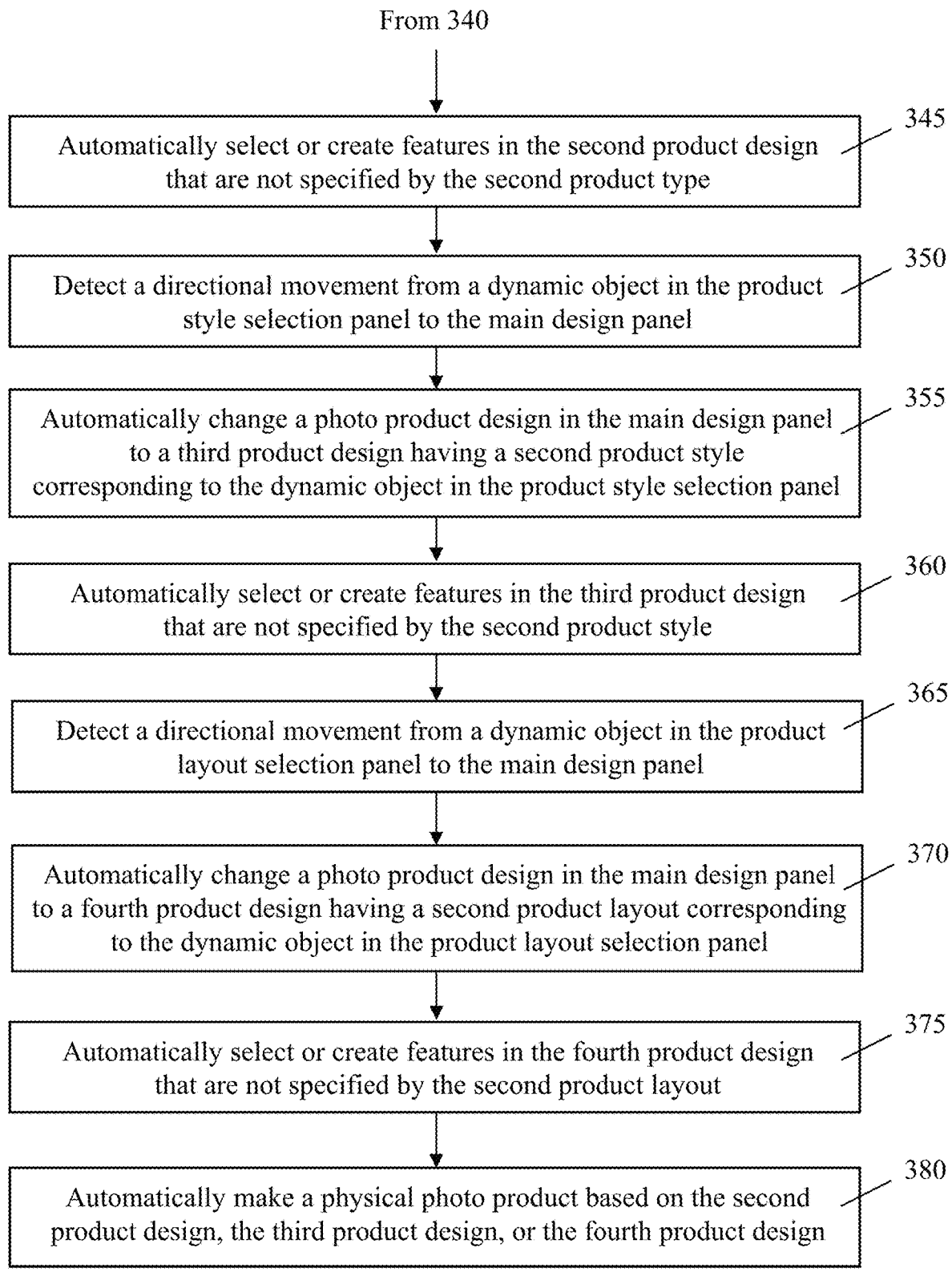
Figure 4:
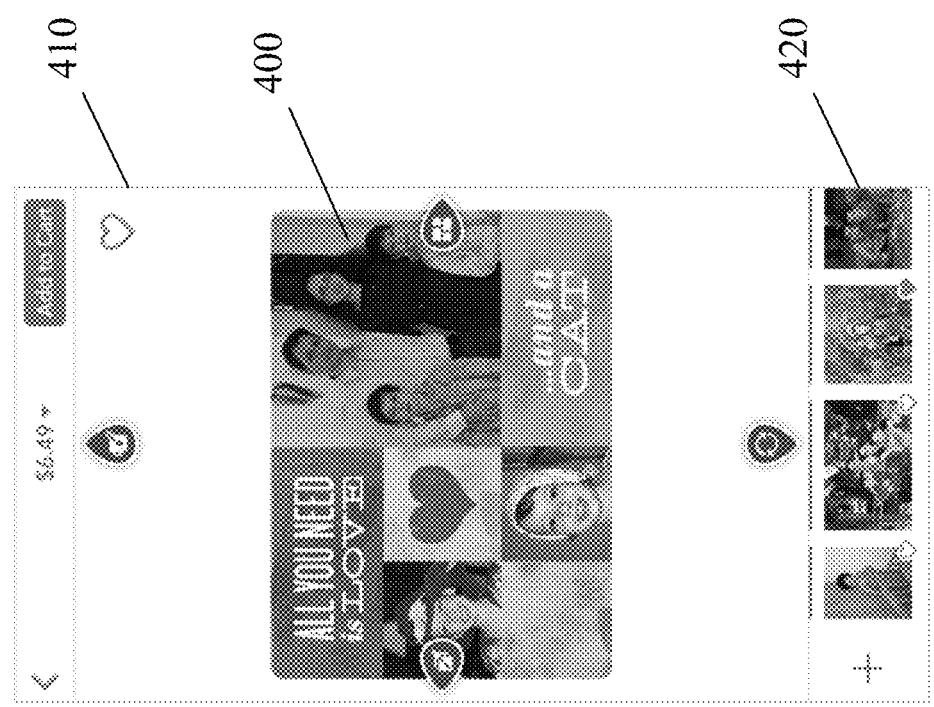
FIG. 4 illustrates an initial product design in a main design panel.

Referring next to FIGS. 2-4, an initial photo product design 400 in a first product type, a first product style, and a first product layout is illustrated in a main design panel 410 on a computer device (e.g. 60, 61) (step 310) by the product design module 210. The initial photo product design 400 may be automatically created by the intelligent product design creation engine 230 based on the knowledge about the user's recent activities, social relationships, important events, hobbies, time and location information, mobile data, past product designs, and order histories. The initial photo product design 400 may be automatically created based on predictions and inferences made using limited information gathered from the user by the intelligent product design creation engine 230. The intelligent product design creation engine 230 can automatically select a product type, product style, and product layout(s) for one or more pages.

The initial photo product design 400 can also be at least in part contributed by a user using tools provided by the product design module 210. For example, the user can select a photo from a photo collection 420 in the main design panel 410 to incorporate into or replace a photo in the product design 400.

Next referring to FIG. 2-4, 5A, a product type selection panel 510, a product style selection panel 520, and a product layout selection panel 530 are displayed adjacent to the main design panel 410 on the computer device (step 315) by the product design module 210 in the photo product design customization system 200.

The product type selection panel 510 on the computer device includes a plurality of dynamic objects 515, 516 each representing a different product type (step 320). In some embodiments, the dynamic objects 515, 516 are intuitively represented by product pictures of different product types.

The dynamic objects 515, 516 in the product type selection panel 510 are automatically generated by the intelligent product design creation engine 230 based on the product types stored in the product type library 224. It should be noted that the dynamic objects 515, 516 represent full product designs in particular product types for the purpose of illustrating the appearances of respective product types. Product design parameters other than the product type, such as incorporated photos, design elements, embellishments, background, and color schemes, are automatically selected or generated by the intelligent product design creation engine 230. The dynamic objects 515, 516 are selectable and moveable to the main panel 410 using user input actions such as a swipe motion or a multi-touch gesture on a touch screen, or a drag-and-drop action or a mouse scroll using a mouse, or a body movement, an eye movement or a gaze change tracked by appropriate devices, etc.

The product style selection panel 520 on the computer device includes a plurality of dynamic objects 525, 526 each representing a different product style (step 325). In some embodiments, the dynamic objects 525, 526 are intuitively represented by product pictures of different product styles.

Similar to the dynamic objects 515, 516 described above, the dynamic objects 525, 526 in the product style selection panel 520 are automatically generated by the intelligent product design creation engine 230 based on the product styles stored in the product style library 226. The dynamic objects 525, 526 represent full product designs in particular product styles for the purpose of illustrating the appearances of respective product 525, 526. Product design parameters other than the product style are automatically selected or generated by the intelligent product design creation engine 230. The dynamic objects 525, 526 are selectable and moveable to the main panel 410 using user input actions such as a swipe motion or a multi-touch gesture on a touch screen, or a drag-and-drop action or a mouse scroll using a mouse, or a body movement, an eye movement or a gaze change tracked by appropriate devices, etc.

A plurality of dynamic objects 535, 536 each representing a different product layout are positioned in the product layout selection panel 530 (step 330) on the computer device. In some embodiments, the dynamic objects 535, 536 are intuitively represented by product pictures of different product layouts.

Similar to the dynamic objects 515, 516 described above, the dynamic objects 535, 536 in the product layout selection panel 520 are automatically generated by the intelligent product design creation engine 230 based on the product layouts stored in the product layout library 228. The dynamic objects 535, 536 represent full product designs in particular product layouts for the purpose of illustrating the appearances of respective product 535, 536. All product design parameters other than the product layout are automatically selected or generated by the intelligent product design creation engine 230. The dynamic objects 535, 536 are selectable and moveable to the main panel 410 using user input actions such as a swipe motion or a multi-touch gesture on a touch screen, or a drag-and-drop action or a mouse scroll using a mouse, or a body movement, an eye movement or a gaze change tracked by appropriate devices, etc.

In some embodiments, still referring to FIG. 2-4, 5A, a directional movement 500 is detected by the user input detection module 220 from a dynamic object 515 in the product type selection panel 510 to the main design panel 410 (step 335). In the present disclosure, the phrase "a directional movement" refers to a user action for moving an "object" at a user interface. Examples of a directional movement can include a swipe motion or a multi-touch gesture on a touch screen, or a drag-and-drop action or a mouse scroll using a mouse, or a body movement, an eye movement or a gaze change tracked by appropriate devices, etc.

In accordance to an advantageous aspect of the presently disclosed method and system, an "object" at a user interface can represent a complete design of a photo product. Thus, in the present disclosure, a user activated directional movement of such an object from one panel (e.g. the product type selection panel 510) to another panel (e.g. the main design panel 410) goes beyond the normal meaning of moving the locations of or swapping objects at a user interfaces. Rather, the directional movement in the present disclosure is an intuitive metaphor for initiating a product design change in the destination panel by the design (characterized by product type, product style, product layout, etc.) of the "object" at the origination panel for such a directional movement.

In response to the directional movement 500, referring now to FIG. 2-4, 5A, 5B, the photo product design (400) in the main design panel 410 is automatically changed to a second product design 550 having a second product type corresponding to the dynamic object 515 in the product type selection panel 510 (step 340). The photo product design in the main design panel 410 before the change can be the initial product design 400 or another product design that has been changed from the initial product design 400 in product style, product layout or other product parameters.

Figure 5A:
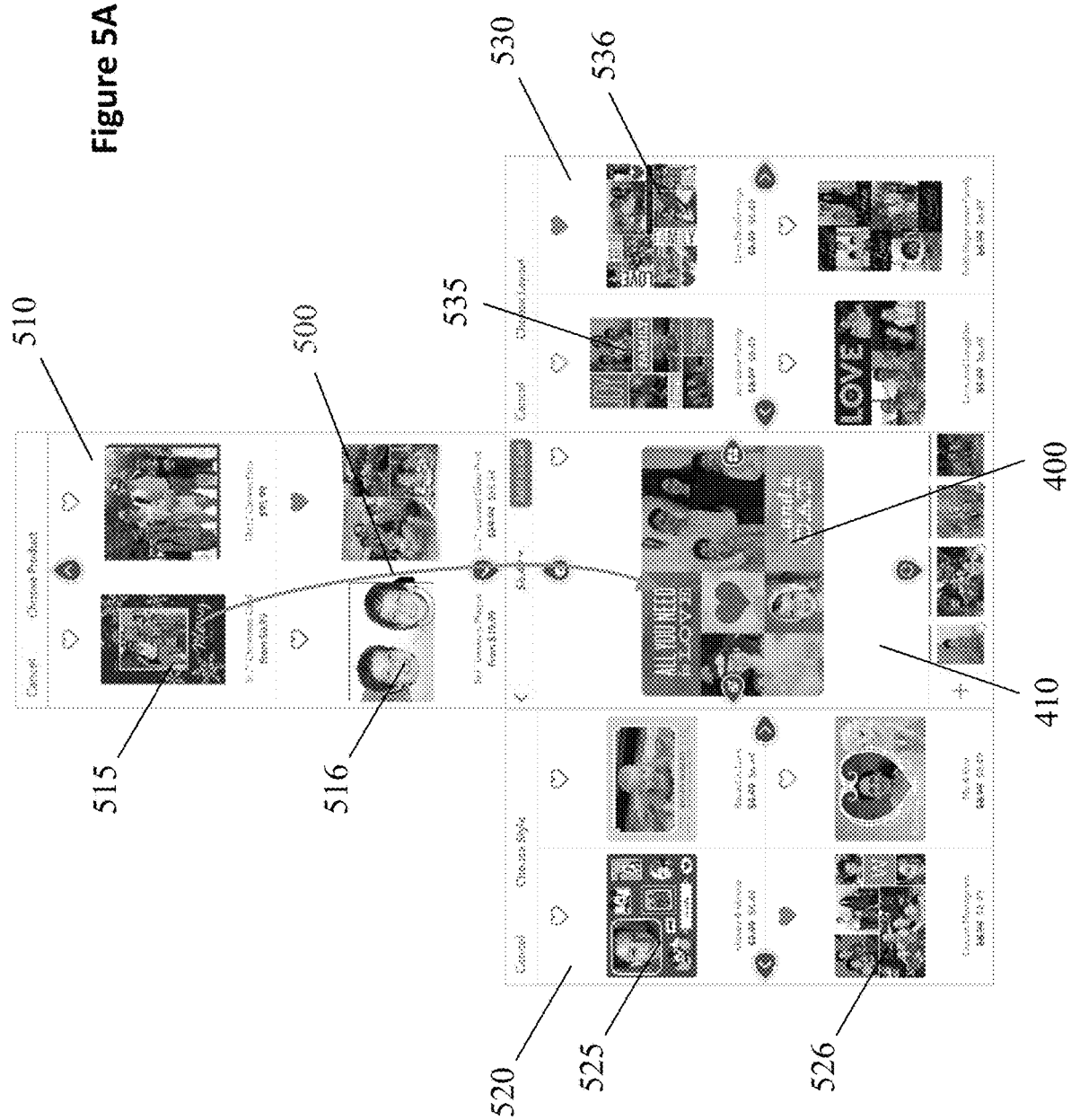
FIG. 5A illustrates a directional movement from a dynamic object in a product type selection panel to the main design panel in accordance with some embodiments of the present invention.
Figure 5B:
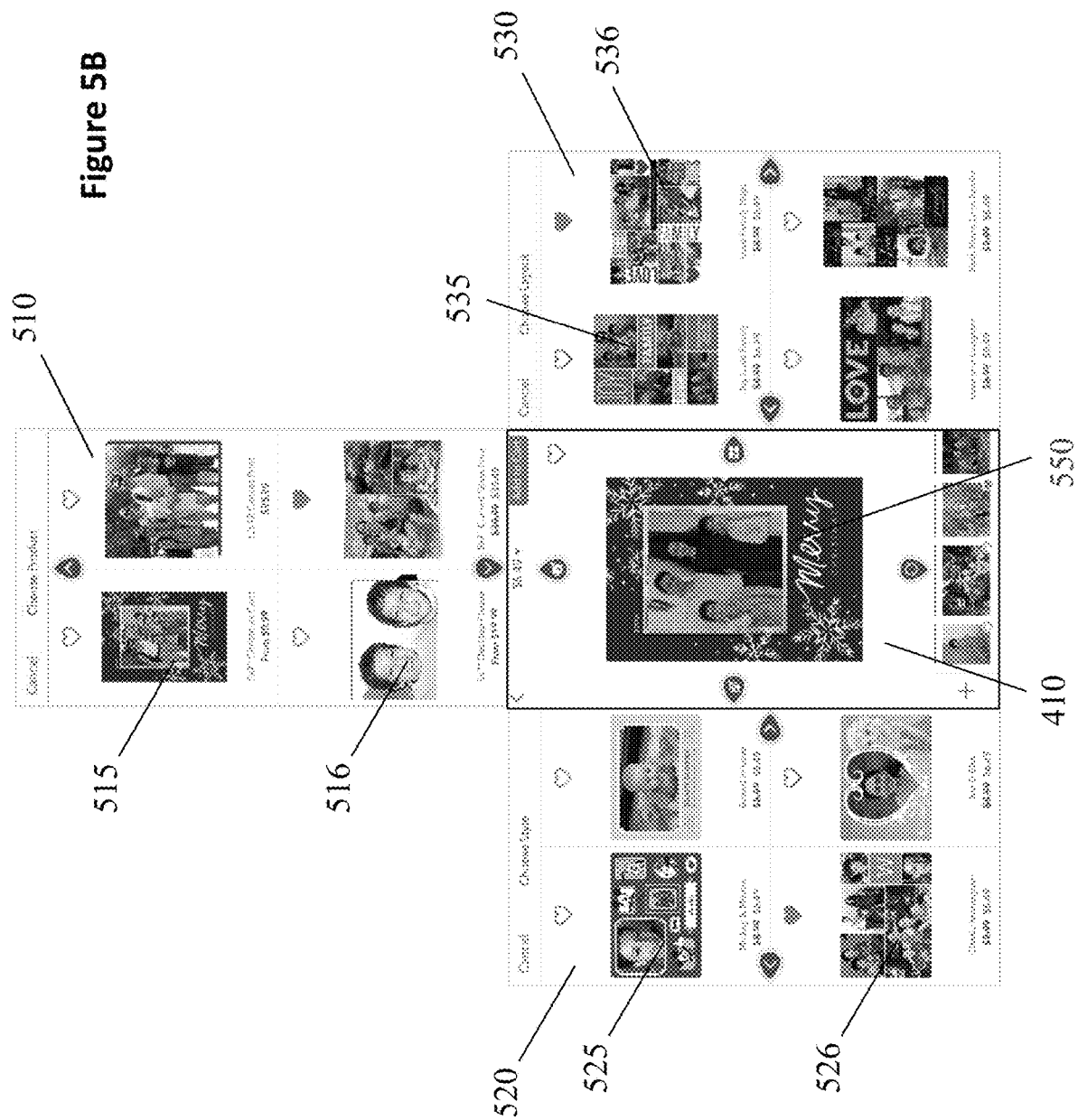
FIG. 5B illustrates a change in the product type of the photo product design in the main design panel in response to the directional movement shown in FIG. 5A.

Features in the second product design 550 that are not specified by the second product type can be automatically selected or created (step 345) by the intelligent product design creation engine 230. Such features can include properties in product style and product layout, and the of selections photos. One or more photo(s) in the second product design 550 can be kept the same as the last product design in the main panel 410 after the directional movement 500 as shown in FIG. 5B. Alternatively, the photo(s) in the second product design 550 can be automatically updated by the intelligent product design creation engine 230 in accordance to the new product type illustrated by the dynamic object 515.

In some embodiments, referring to FIG. 2-4, 6A, a directional movement 600 is detected by the user input detection module 220 from a dynamic object 525 in the product style selection panel 530 to the main design panel 410 (step 350).

In response to the directional movement 600, referring now to FIG. 2-4, 6A, 6B, the photo product design (e.g. 400, or 550 in FIG. 5B) in the main design panel 410 can be automatically changed to a third product design 650 having a second product style corresponding to the dynamic object 525 in the product style selection panel 520 (step 355). The photo product design in the main design panel 410 before the change can be the initial product design 400 or another product design (e.g. 550 in FIG. 5B) that has been changed from the initial product design 400 in product style, product layout or other product parameters.

Figure 6B:
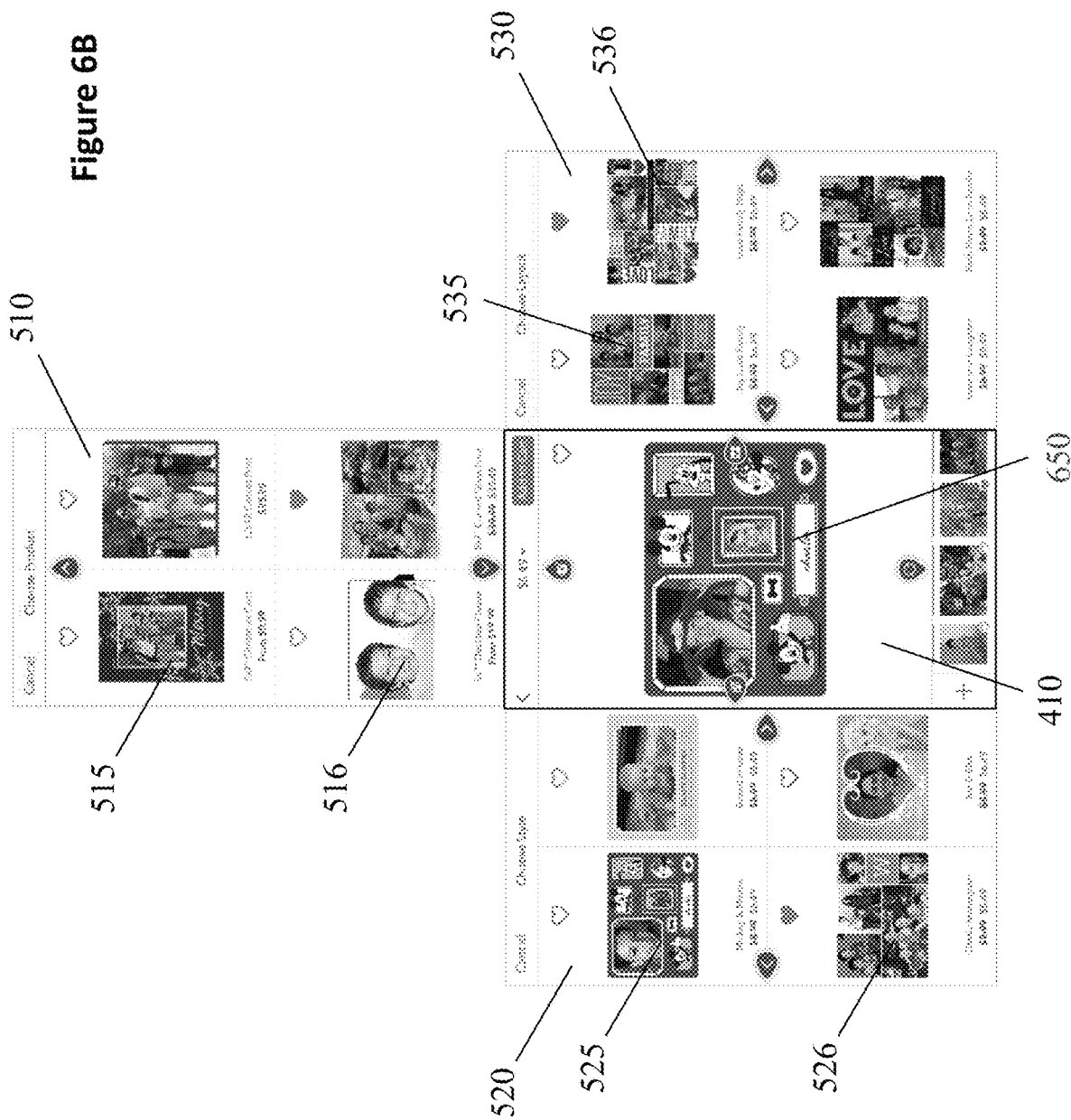
FIG. 6B illustrates a change in the product style of the photo product design in the main design panel in response to the directional movement shown in FIG. 6A.

Features in the third product design 650 that are not specified by the second product style can be automatically selected or created (step 360) by the intelligent product design creation engine 230. Such features can include properties in product type and product layout, and the of selections photos. One or more photo(s) in the third product design 650 can be kept the same as the last product design in the main panel 410 after the directional movement 600 as shown in FIG. 6B. Alternatively, the photo(s) in the third product design 650 can be automatically updated by the intelligent product design creation engine 230 in accordance to the new product style illustrated by the dynamic object 525. As described above, in the present disclosure, "product style" refers to the background design, embellishments, the color scheme, or other design elements of a photo product.

In some embodiments, referring to FIG. 2-4, 7A, a directional movement 700 is detected by the user input detection module 220 from a dynamic object 535 in the product layout selection panel 530 to the main design panel 410 (step 365).

In response to the directional movement 700, referring now to FIG. 2-4, 7A, 7B, the photo product design (e.g. 400, or 550 in FIG. 5B, or 650 in FIG. 6B) in the main design panel 410 can be automatically changed to a fourth product design 750 having a second product layout corresponding to the dynamic object 535 in the product layout selection panel 530 (step 370). The photo product design in the main design panel 410 before the change can be the initial product design 400 or another product design (e.g. 550 in FIG. 5B or 650 in FIG. 6B) that has been changed from the initial product design 400 in product style, product layout or other product parameters.

Figure 7A:
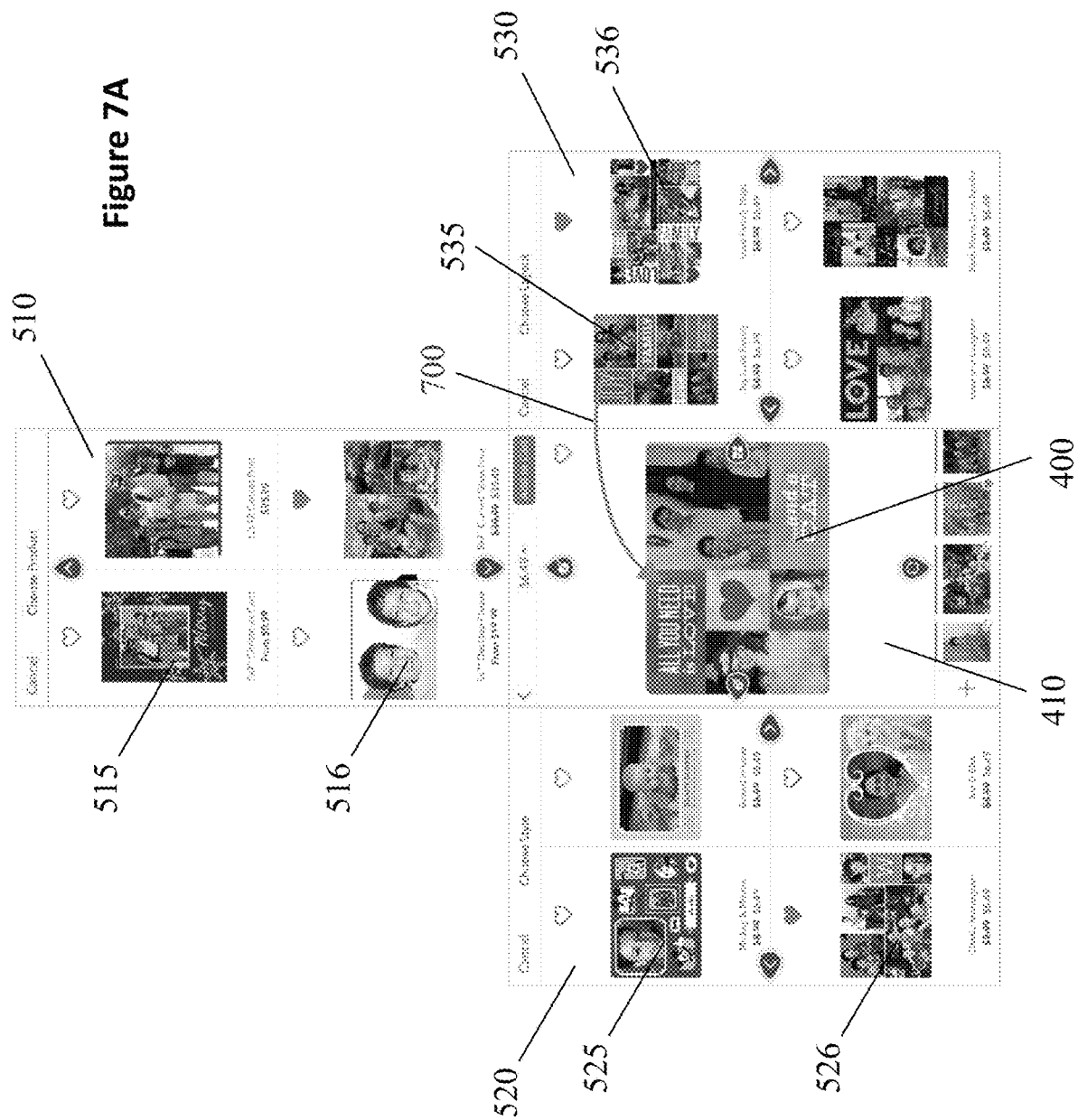
FIG. 7A illustrates a directional movement from a dynamic object in a product layout selection panel to the main design panel in accordance with some embodiments of the present invention.
Figure 7B:
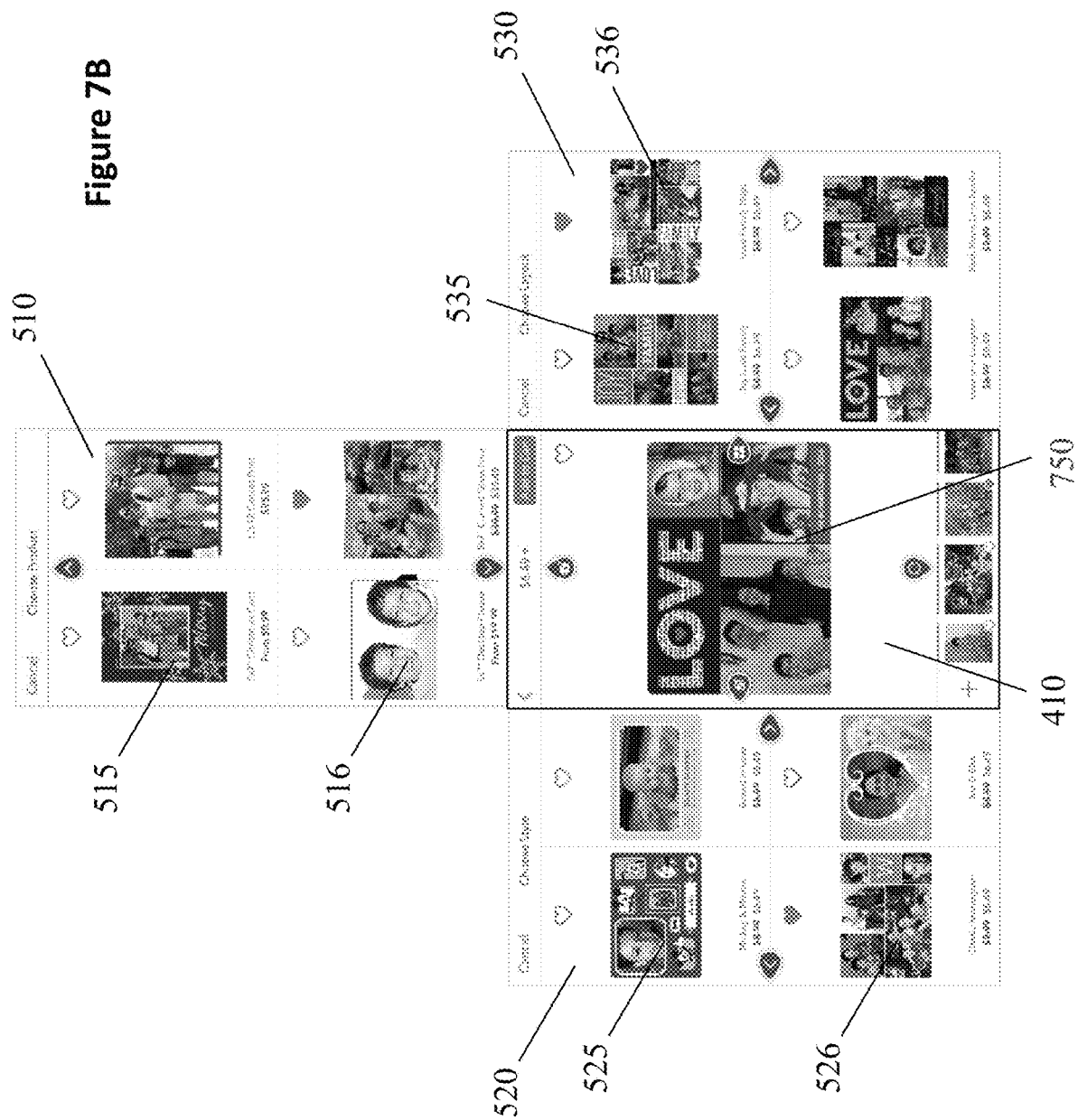
FIG. 7B illustrates a change in the product layout of the photo product layout in the main design panel in response to the directional movement shown in FIG. 7A.
Figure 8:
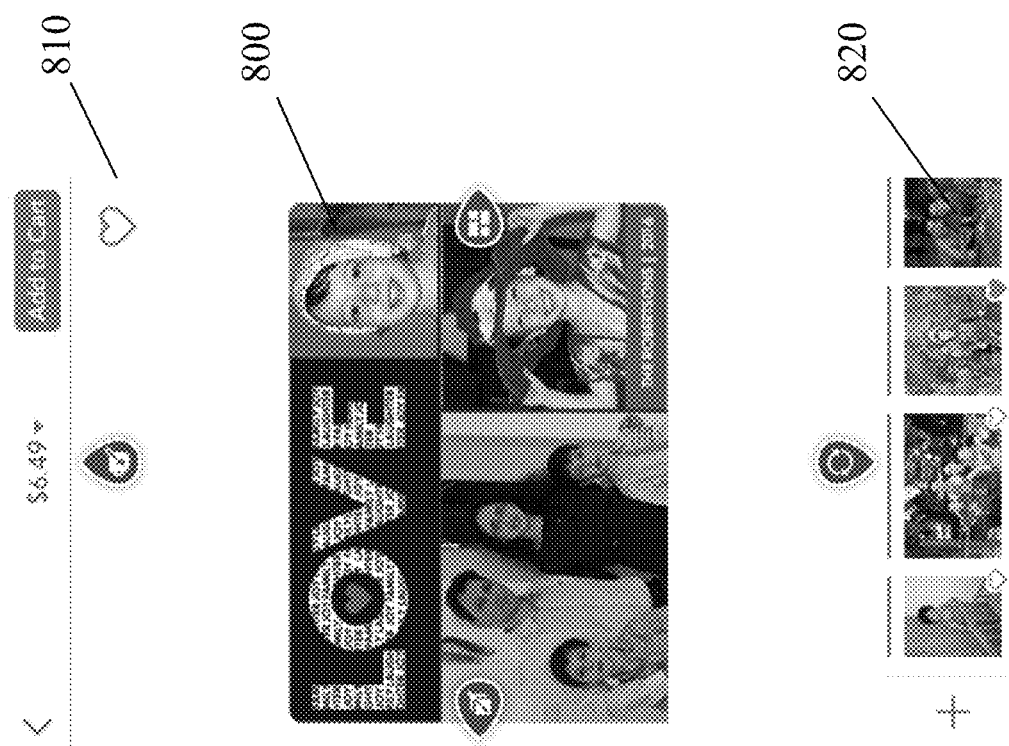
FIG. 8 illustrates a product design after changes in product type, product style, or product layout for reviewing and ordering a photo product.

Features in the fourth product design 750 that are not specified by the second product layout can be automatically selected or created (step 375) by the intelligent product design creation engine 230. Such features can include properties in product type and product style, and the of selections photos. One or more photo(s) in the third product design 650 can be kept the same as the last product design in the main panel 410 after the directional movement 700 as shown in FIG. 7B. Alternatively, the photo(s) in the fourth product design 750 can be automatically updated by the intelligent product design creation engine 230 in accordance to the new product layout illustrated by the dynamic object 535.

After the above described changes in product type, product style, and product layout, the user can review and edit one or more pages of a photo product design 800, at a user interface 810, based on the second product design, the third product design, or the fourth product design (step 380). The product design module 210 in the photo product design customization system 200 detects edit commands by the user and update the photo product design 800 accordingly. The user interface 810 can optionally include the main panel 410 shown FIGS. 4-7B and a photo collection 820. After the user submits an order, can be automatically made (step 380).

It should be noted that the sequence of steps shown in FIG. 3 can be changed while still compatible with the scope of the present invention. For example, steps 315-330 can be switched. Steps 335-345, steps 350-360, steps 365-375 can be sequenced different from the described above. In other words, the product type, the product style, and product layout can be changed in whichever order that the user choose to take.

Moreover, one or more steps in FIG. 3 can be optional. For example, using dynamic movements detectable by the user input detection unit 220 (FIG. 2), a user can choose to change only one or any combination of the product type, the product style, and the product layout of a product design in the main panel. Accordingly, the presented disclosed invention is compatible with a user interface that includes a main design panel and one or any two of a product type selection panel, a product style selection panel, and/or a product layout selection panel adjacent to the main design panel.

The presently disclosed method and system can include one or more the following advantages. First, a user can change the complete design of a photo product using very simple and intuition user input actions. Secondly, a large number of design parameters can be automatically changed consistently while the user drives one or more main design changes. Thirdly, the customization of a photo product can be accomplished while staying in the same page view of a computer user interface. This makes design creation and optimization more intuitive and less time consuming, reduces the chance to get lost when users have to click through multiple page views to accomplish such actions.

It should be understood that the presently disclosed systems and methods can be compatible with different devices or applications other than the examples described above. For example, the disclosed method is suitable for desktop, tablet computers, mobile phones and other types of network connectable computer devices. The photo products compatible with the present invention are not limited to the examples described above.

What is claimed is:

1. A computer-implemented method for customizing a photo product design with minimal and intuitive user inputs, comprising:

storing a product style library comprising a first product style and a second product style in a photo product customization system;

displaying a photo product design in the first product style in a main design panel on a computer device, wherein the photo product design includes one or more first images and a first background image associated with the first product style selected from the product style library;

displaying a product style selection panel adjacent to the main design panel on the computer device, wherein the product style selection panel includes one or more first dynamic objects each representing the second product style stored in the product style library;

detecting a first directional movement from a first dynamic object in the product style selection panel to the main design panel by a user input detection unit in the photo product customization system;

in response to detection of the first directional movement, automatically changing the photo product design in the main design panel, by an intelligent product design creation engine in the photo product customization system, to a second product design having the second product style corresponding to the first dynamic object in the product style selection panel, wherein the first background image is changed to a second background image associated with the second product style stored in the product style library; and in response to the automatically changing the photo product design in the main design panel, automatically updating the one or more first images in the photo product design in the main design panel based on the second product style, wherein a physical photo product is made at least in part based on the second product design.

2. The computer-implemented method of claim 1, further comprising:

automatically selecting or creating, by the intelligent product design creation engine, one or more features in the second product design that are not specified by the second product style.

3. The computer-implemented method of claim 2, wherein the one or more features include product type, product layout, or selection of photos.

4. The computer-implemented method of claim 1, wherein the one or more first dynamic objects are represented by product pictures of different product styles.

5. The computer-implemented method of claim 1, further comprising:

displaying a product type selection panel adjacent to the main design panel on the computer device, wherein the product type selection panel includes one or more second dynamic objects each representing a particular product type;

detecting a second directional movement from a second dynamic object in the product type selection panel to the main design panel by the user input detection unit; and in response to detection of the second directional movement, automatically changing the photo product design or the second product design in the main design panel, by the intelligent product design creation engine, to a third product design having a second product type corresponding to the second dynamic object in the product type selection panel, wherein the physical photo product is made at least in part based on the third product design.

6. The computer-implemented method of claim 1, further comprising:

displaying a product layout selection panel adjacent to the main design panel on the computer device, wherein the product layout selection panel includes one or more third dynamic objects each representing a particular product layout;

detecting a third directional movement from a third dynamic object in the product layout selection panel to the main design panel by the user input detection unit; and in response to detection of the third directional movement, automatically changing the photo product design or the second product design in the main design panel, by the intelligent product design physical creation engine, to a fourth product design having a second product layout corresponding to the third dynamic object in the product layout selection panel, wherein the photo product is made at least in part based on the fourth product design.

7. The computer-implemented method of claim 1, wherein automatically updating the one or more first images in the photo product design comprises:

keeping at least one image in the one or more first images in the photo product design of the second product style in the main design panel.

8. The computer-implemented method of claim 1, further comprising:

in response to changing the photo product design in the main design panel to the second product style, automatically updating a product layout in the photo product design in the main design panel based on the second product style.

9. The computer-implemented method of claim 1, wherein the one or more first images includes photos from one or more users.

10. The computer-implemented method of claim 1, wherein the first product style or the second product style stored in the photo product customization system specifies a background design, an embellishment, a color scheme, a topic, or a caption of a photo product.

* * * * *